(12) United States Patent
Wang et al.

(10) Patent No.: US 9,860,786 B1
(45) Date of Patent: Jan. 2, 2018

(54) EFFICIENT BACKHAUL FOR RELAY NODES

(71) Applicant: Sprint Spectrum LP, Overland Park, KS (US)

(72) Inventors: Yu Wang, Fairfax, VA (US); Dhaval Mehta, Aldie, VA (US); Won An, Fairfax, VA (US); Udit Thakore, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 90 days.

(21) Appl. No.: 15/011,925

(22) Filed: Feb. 1, 2016

(51) Int. Cl.
| *H04W 28/08* | (2009.01) |
| *H04W 28/06* | (2009.01) |
| *H04L 29/06* | (2006.01) |
| *H04B 7/155* | (2006.01) |
| *H04W 88/04* | (2009.01) |

(52) U.S. Cl.
CPC ............ *H04W 28/06* (2013.01); *H04B 7/155* (2013.01); *H04L 65/608* (2013.01); *H04L 65/80* (2013.01); *H04W 88/04* (2013.01)

(58) Field of Classification Search
CPC ........... H04L 29/12735; H04L 12/4633; H04L 65/608; H04L 65/80; H04W 28/06; H04W 88/04
See application file for complete search history.

(56) References Cited

U.S. PATENT DOCUMENTS

| 8,259,637 B2 | 9/2012 | Bertrand et al. | |
| 2009/0109924 A1* | 4/2009 | Sato | H04W 36/0055 370/331 |
| 2010/0103865 A1 | 4/2010 | Ulupinar et al. | |
| 2010/0260098 A1 | 10/2010 | Ulupinar et al. | |
| 2010/0260129 A1* | 10/2010 | Ulupinar | H04L 12/4633 370/329 |
| 2011/0158166 A1* | 6/2011 | Lee | H04W 28/06 370/328 |
| 2012/0294211 A1* | 11/2012 | Zhu | H04W 28/06 370/310 |
| 2013/0155918 A1* | 6/2013 | Singh | H04W 28/06 370/310 |

* cited by examiner

Primary Examiner — Benjamin H Elliott, IV (57) ABSTRACT

Network nodes including relays and access nodes are configured to transport data packets by identifying the type of data packet and correspondingly compressing a header portion of the data packet. Operations described herein may be implemented in a network that is capable of transporting voice over LTE (VoLTE) data packets using the GPRS tunneling protocol (GTP). A unique value is marked to an IP header of the voice data packet, and the GTP headers may be mapped to a unique bearer that is different from a standard voice bearer used in the network. The compression uses a robust header compression (RoHC), which includes compressing a RTP header portion along with a GTP header portion using existing or new compression profiles.

17 Claims, 10 Drawing Sheets

EFFICIENT BACKHAUL FOR RELAY NODES

TECHNICAL BACKGROUND

As wireless networks evolve and grow, there are ongoing challenges in providing high-quality service to increasing numbers of wireless devices or user equipment (UE) in various coverage areas of a wireless network. One approach to improving service quality and coverage is to designate a wireless device as a relay node or relay UE for relaying communication between a base station or donor access node, and an end-user wireless device. Relay wireless devices may be used at the edge of a coverage area of a donor access node to improve coverage and/or service, as well as in crowded areas having a high number of other wireless devices to increase the available throughput to the end-user wireless devices being relayed. However, relay wireless devices may be limited in their ability to effectively service end-user wireless devices that are attached to it, particularly if the throughput of the backhaul connection from the donor access node is limited.

OVERVIEW

Exemplary embodiments described herein include systems, methods, and nodes for improving a backhaul connection of a relay access node. A method for compressing data on a backhaul link of a relay device includes receiving, at the relay device, a data packet via a GPRS tunneling protocol (GTP) tunnel, and compressing a header portion of the data packet. The header portion comprises a real-time-transport protocol (RTP) header portion. The method further includes transmitting the data packet with the compressed header portion to a macro access node.

Another method for compressing data on a backhaul link of a relay node includes receiving, at a macro access node via a GPRS tunneling protocol (GTP) tunnel, a data packet comprising a header portion, the header portion further comprising a GTP header portion and a real-time-transport protocol (RTP) header portion. The method includes compressing the RTP header portion using a robust header compression, and transmitting the data packet with the compressed RTP header portion to the relay node.

A system for donor selection includes a relay access node configured to relay wireless services from a donor access node to one or more wireless devices, and a processor communicatively coupled to the relay access node. The processor configures the relay access node to execute operations comprising compressing a first real-time-transport protocol (RTP) header portion of an uplink voice-over-IP (VoIP) data packet using an existing robust header compression profile, and decompressing a second RTP header portion of a downlink VoIP data packet using the existing robust header compression profile. The first RTP header portion is decompressed at the donor access node subsequent to the compressing, and the second RTP header portion is compressed at the donor access node prior to the decompressing.

DETAILED DESCRIPTION

In embodiments disclosed herein, a relay wireless device is configured to transport data packets to and receive data packets from a macro or donor access node by identifying the type of data packet and correspondingly compressing a header portion of the data packet. Generally, the relay wireless device may be implemented in a network that is capable of transporting voice data packets, such as Voice over LTE (VoLTE) data packets, between end-user wireless devices, access nodes, gateways, and a packet based network, using transport tunnels such as those using the GPRS tunneling protocol (GTP). A small access node coupled to the relay wireless device, for example a picocell, is configured to encapsulate a voice data packet within a tunnel and to mark a unique value to an IP header of the voice data packet. The unique value may be a differentiated services code point (DSCP) value. The relay wireless device receives the voice data packet, and is configured to compress one or more header portions of the voice data packet, to map the tunnel header to a unique bearer that is different from a standard voice bearer used in the network, and to transmit the voice data packet to its donor access node, such as a macro access node. The compression uses a robust header compression (RoHC), which includes compressing a real-time transport protocol (RTP) header portion that includes a corresponding user datagram protocol (UDP) and internet protocol (IP) header portion, along with the GTP header portion that includes another corresponding UDP and IP header portion, as further described herein. The donor access node is configured to recognize the data packet as a voice data packet based on the unique bearer, to decompress the header, and to forward the data packet in a second GTP tunnel to one or more gateways. The one or more gateways are configured to remove the second and first GTP tunnel headers at various stages, eventually forwarding the voice data packet to an IP network, such as an IP multimedia system (IMS) or public data network (PDN). The embodiments provided herein can improve the transport efficiency of the backhaul link in relay-based networks and, therefore, increase the number of end-user devices that can be served by relay access nodes, particularly in a voice-over LTE (VoLTE) system. For example, in an IPv6 network using the adaptive multi-rate (AMR) 12.2 kbps codec, the proposed methods achieve more than 10% improvement in backhaul transport efficiency. These and additional operations are further described with respect to the embodiments depicted in FIGS. 1-5 below.

Figure 1:
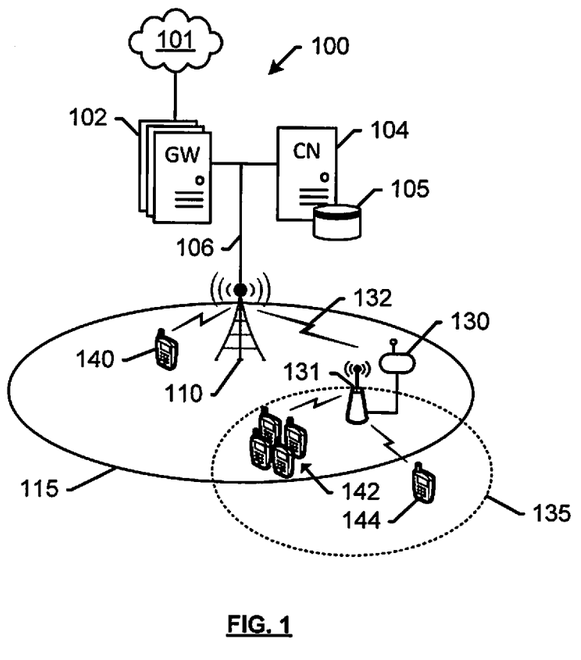
FIG. 1 depicts an exemplary system for compressing data on a backhaul connection.

FIG. 1 depicts an exemplary system 100 for donor selection. System 100 comprises a communication network 101, gateways 102, controller node 104, access node 110, relay wireless device 130, and end-user wireless devices 140, 142, and 144. In this embodiment, access node 110 provides services to end-user wireless devices 142, 144 via relay access node that comprises a combination of relay wireless device 130 and relay access point or node 131. Consequently, access node 110 may be referred to as a donor access node. Relay wireless device 130 is thus configured to relay services from donor access node 110 to end-user wireless devices 142, 144. To achieve this, relay wireless device 130 may comprise a customer premise equipment (CPE), which may be any stationary LTE wireless device having a stronger computational & RF capability versus standard wireless devices, as well as a directional antenna and a dedicated power supply. Relay wireless device 130 is communicatively coupled to relay access point 131, which may be a small access node. Small access node 131 may include a mini-macro or picocell that is capable of providing a wireless access point for end-user wireless devices 142, 144, of which end-user wireless devices 142 comprise a cluster of wireless devices. Donor access node 110 is illustrated as having coverage area 115, and small access node 131 is illustrated as having coverage area 135. Relay wireless device 130 is located within coverage area 115. End-user wireless devices 140, 142 are located within coverage area 115, and end-user wireless device 144 is located outside coverage area 115, but within coverage area 135 of small access node 131. As a consequence, cluster of end-user wireless devices 142 may access network services using the combination of relay wireless device 130 and small access node 131, rather than overload donor access node 110, which may be serving numerous other devices, such as end-user wireless device 140. Moreover, end-user wireless device 144 that is outside range 115 may access network services from donor access node 110 by virtue of being connected to relay wireless device 130 via small access node 131.

In operation, the combination of donor access node 110, relay wireless device 130, and small access node 131, is configured to transport data packets between one or more of end-user wireless devices 142, 144 and network 101, which may include a packet-based network. This generally includes identifying a type of the data packet, such as a voice data packet, based on a unique identifier such as a DSCP value or a unique radio bearer such as a quality-of-service (QoS) class identifier (QCI) bearer, and correspondingly compressing a header portion of the data packet. Moreover, network nodes such as small access node 131, relay wireless device 130, donor access node 110, or gateways 102 may each be configured to mark the data packet with the unique identifier or QCI radio bearer, and to recognize the data packet based on one or more of the unique identifier or the bearer. The compression of the header portions of the data packet may therefore be based on such identification of the data packet, and a known size of the various header portions of the data packet. For instance, the data packet may be encapsulated within one or more GPRS tunneling protocol (GTP) tunnels that are set up between relay wireless device 130 and donor access node 110, and between donor access node 110 and one or more of gateways 102. Consequently, the compression of header portions includes compressing a real-time transport protocol (RTP) header portion as well as a GTP header portion of the data packet. The compression uses a robust header compression (RoHC), as further described herein.

For uplink data packets, donor access node 110 is configured to recognize the data packet received from relay wireless device 130 as a voice data packet based on the unique bearer, to decompress one or more header portions, and to forward the data packet in a second GTP tunnel to one or more of gateways 102, which may be configured to remove the second and first GTP tunnel headers at various stages, eventually forwarding the voice data packet to network 101. Similarly, for downlink data packets, donor access node 110 is configured to receive and identify the data packet from one or more of gateways 102 in a second GTP tunnel, to compress the one or more header portions, and to forward the data packet to relay wireless device 130 in a first GTP tunnel, wherein the relay wireless device decompresses the one or more headers and correspondingly forwards the data packet to the destination end-user wireless device attached to small access node 131.

In an embodiment, relay wireless device 130 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from donor access node 110 are amplified and transmitted by relay wireless device 130 to one or more of wireless devices 142, 144. Likewise, RF signals received from wireless devices 142, 144 are amplified and transmitted by relay wireless device 130 to donor access node 110. Alternatively or in addition, a layer 2 relay device performs a decode and forward (DF) function. RF signals received from donor access node 110 are demodulated and decoded, then encoded and modulated again before being transmitted by relay wireless device 130 to one or more of wireless devices 142, 144. Likewise, RF signals received from one or more of wireless devices 142, 144 are demodulated and decoded, then encoded and modulated again before being transmitted by relay wireless device 130 to donor access node 110. Alternatively or in addition, a layer 3 relay device also performs a decode and forward function. However, a layer 3 relay device also performs additional processing (such as ciphering and/or data concatenation/segmentation/resassembly) In other words, relay wireless device 130 performs demodulation and decoding of the received RF signals (either uplink or downlink), processes received data, then encodes, modulates, and transmits the data to one or more of wireless devices 142, 144.

Wireless devices 130, 140, 142, 144 may be any device, system, combination of devices, or other such communication platform capable of communicating wirelessly with access node 110 using one or more frequency bands deployed by access node 110. Wireless devices 130, 140, 142, 144 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access nodes 110. Other types of communication platforms are possible. In some embodiments, relay wireless device 130 includes stronger computational & radiofrequency capabilities than an average wireless device, as well as a directional antenna, and dedicated power supply, so that it can sustain an over-the-air backhaul link for wireless devices 142, 144 that attached to small access node 131.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 130, 140, 142, 144. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication link 106 can use various communication media, such as air, space, metal, optical fiber, or some other signal propagation path—including combinations thereof. Communication link 106 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communication link 106 may include Si communications links. Other wireless protocols can also be used. Communication link 106 can be a direct link or might include various equipment, intermediate components, systems, and networks. Communication link 106 may comprise many different signals sharing the same link Gateway nodes 102 can be any network node or plurality of network nodes that are configured to interface with other network nodes using various protocols. Gateway nodes 102 can communicate user data over system 100. Gateway nodes 102 can be standalone computing devices, computing systems, or network components, and can be accessible, for example, by a wired or wireless connection, or through an indirect connection such as through a computer network or communication network. For example, gateway nodes 102 can include a serving gateway (S-GW) and/or a public data network gateway (P-GW), etc. Gateway nodes 102 can include a relay S-GW/P-DW combination for providing gateway services to relay wireless device 130, as well as a UE S-GW/P-DW combination for providing gateway services to one or more of end-user wireless devices 140, 142, 144. In embodiments described herein, data packets such as voice over IP (VoIP) data packets may be routed from one or more of wireless devices 142, 144 to a relay S-GW/P-GW first, and then to a UE S-GW/P-GW. However, persons having ordinary skill in the art would recognize that gateway nodes 102 are not limited to any specific technology architecture, such as Long Term Evolution (LTE), and can be used with any network architecture and/or protocol.

Each of gateway nodes 102 can comprise a processor and associated circuitry to execute or direct the execution of computer-readable instructions to obtain information. Gateway nodes 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway nodes 102 can receive instructions and other input at a user interface. Operations performed by one or more of gateway nodes 102 are further described with reference to FIGS. 5-9.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing access node characteristics. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

Access nodes 110 and 131 can be any network node configured to provide communication between wireless devices 130, 140, 142, 144, and communication network 101. Access nodes 110, 131 can be standard access nodes and/or short range, low power, small access nodes. A standard access node such as donor access node 110 can be a macrocell access node such as a base transceiver station, a radio base station, an eNodeB device, or an enhanced eNodeB device, or the like. In an exemplary embodiment, a macrocell access node can have a coverage area 115 in the range of approximately five kilometers to thirty five kilometers and an output power in the tens of watts. A small access node such as small access node 131 can include a microcell access node, a picocell access node, a femtocell access node, or the like such as a home NodeB or a home eNodeB device. Moreover, it is noted that while access nodes 110, 131 are illustrated in FIG. 1, any number of access nodes can be implemented within system 100.

Access nodes 110, 131 can comprise a processor and associated circuitry to execute or direct the execution of computer-readable instructions to obtain information.

Access nodes 110, 131 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 110, 131 can receive instructions and other input at a user interface. Access node 110 communicates with gateway nodes 102 and controller node 104 via communication link 106. Operations performed by one or both of access nodes 110, 131 are further described herein with reference to FIGS. 5-9.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101.

Figure 2:
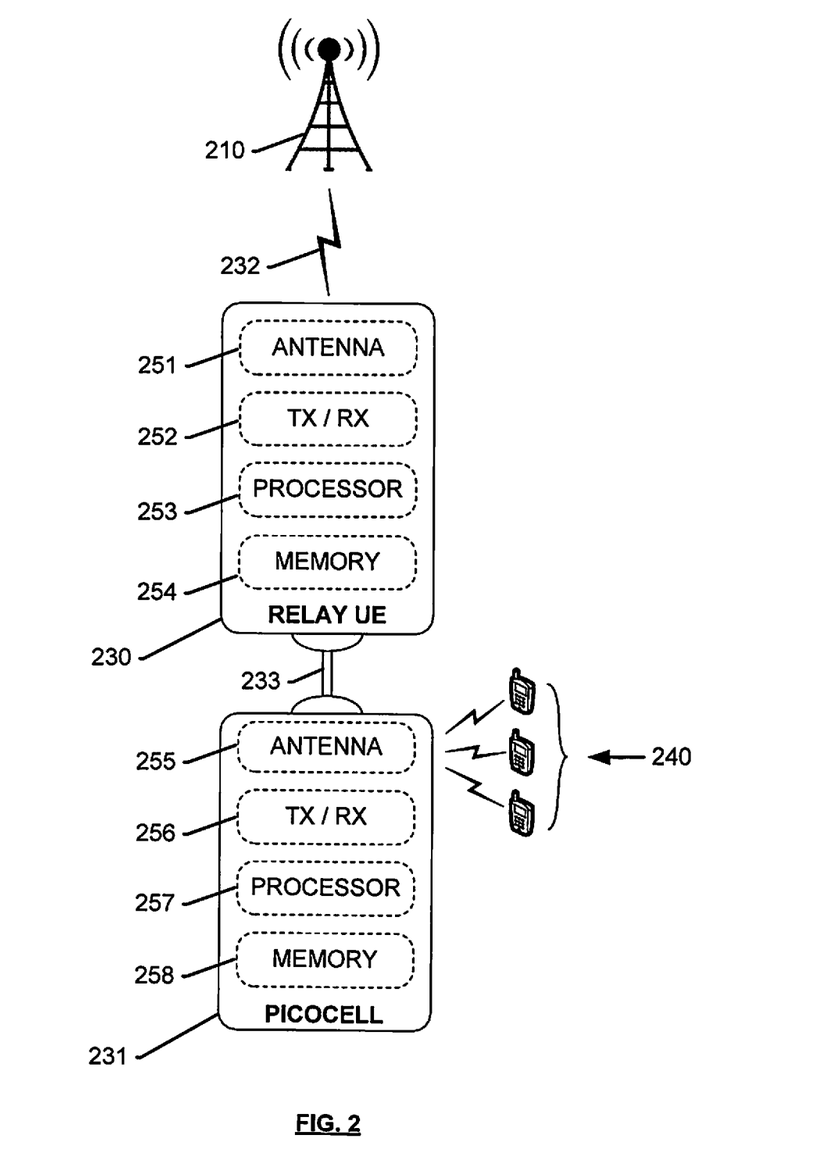
FIG. 2 depicts an exemplary relay wireless device coupled to a small access node.

FIG. 2 depicts an exemplary relay wireless device 230, or relay user equipment (UE), coupled to a small access node 231, or picocell. Relay UE 230 is illustrated as comprising an antenna 251 for direct (i.e. unrelayed) communication with donor access node 210 via communication link 232, a transceiver 252, a processor 253, and a memory 254 for storing instructions that enable relay UE 230 to perform operations described herein. In some embodiments, relay UE 230 is referred to as a customer premise equipment (CPE), which includes any stationary LTE wireless device having a stronger computational & RF capability versus standard wireless devices, as well as a directional antenna and a dedicated power supply, enabling relay UE 230 to efficiently provide resources to wireless devices 240 via picocell 231. Consequently, picocell 231 may be co-located with relay UE 230, and is connected to relay UE 230 via a communication interface 233. Communication interface 233 may be any interface that enables direct communication between relay UE 230 and picocell 231, such as USB, FireWire, Ethernet, or any other serial, parallel, analog, or digital interface. Picocell 231 is illustrated as comprising an antenna 255 for wireless communication with end-user wireless devices 240, a transceiver 256, a processor 257, and a memory 258 for storing instructions that enable picocell 231 to perform operations described herein. In some embodiments, picocell 231 may be a Home eNodeB. Moreover, although only one transceiver is depicted in each of relay UE 230 and picocell 231, additional transceivers may be incorporated in order to facilitate communication across interface 233 and other network elements.

In operation, relay UE 230 relays network services from donor access node 210 to wireless devices 240 via picocell 231. Relay UE 230 may begin to function as a relay UE by sending a message to donor access node 210 to indicate to donor access node 210 that UE 230 is functioning as a relay UE. Donor access node 210 may consequently alter how UE 230 is treated. For example, relay UE 230 may be provided with preferential treatment because it is functioning as a relay. In some embodiments, UE 230 can request to send a buffer status report to donor access node 210. Donor access node 210 can grant this request in a conventional manner. Relay UE 230 may respond to the grant by sending a short buffer status report. This short buffer status report is associated with a logical channel group that indicates the buffer status report is communicating the status of the UE as a relay, and thus is not asking for additional resource allocations (like a 'conventional' buffer status report would indicate). In other words, when a UE responds with a buffer status report for the 'special' logical channel group, it means that the buffer status report is not actually reporting the status of a buffer. Rather, this buffer status report indicates that the UE is now functioning as a relay. Once status of relay UE 230 is established, relay UE 230 may instruct picocell 231 to start accepting connection requests from one or more of end-user wireless devices 240.

As described herein, relay UE 230, picocell 231, and donor access node 210 are configured to transport data packets to and from end-user wireless devices 240 by identifying the type of data packet based on a unique identifier or a radio bearer, and correspondingly compressing or decompressing a header portion of the data packet. For example, picocell 231 may be configured to encapsulate a voice data packet received from one or more of end-user wireless devices 240 within a tunnel and to mark a unique value to an IP header of the voice data packet. The unique value may be a differentiated services code point (DSCP) value. Relay UE 230 receives the voice data packet, and is configured to compress one or more header portions of the voice data packet including a real-time transport protocol (RTP) header and a GTP tunnel header, to map the tunnel header to a unique bearer that is different from a standard voice bearer used in the network, and to transmit the voice data packet to donor access node 210. The compression uses a robust header compression (RoHC), and one or more RoHC profiles based on which header is being compressed. Donor access node 210 is configured to recognize the data packet as a voice data packet based on the unique bearer, to decompress the header, and to forward the data packet in a second GTP tunnel to one or more gateways, as further described herein.

Figure 3:
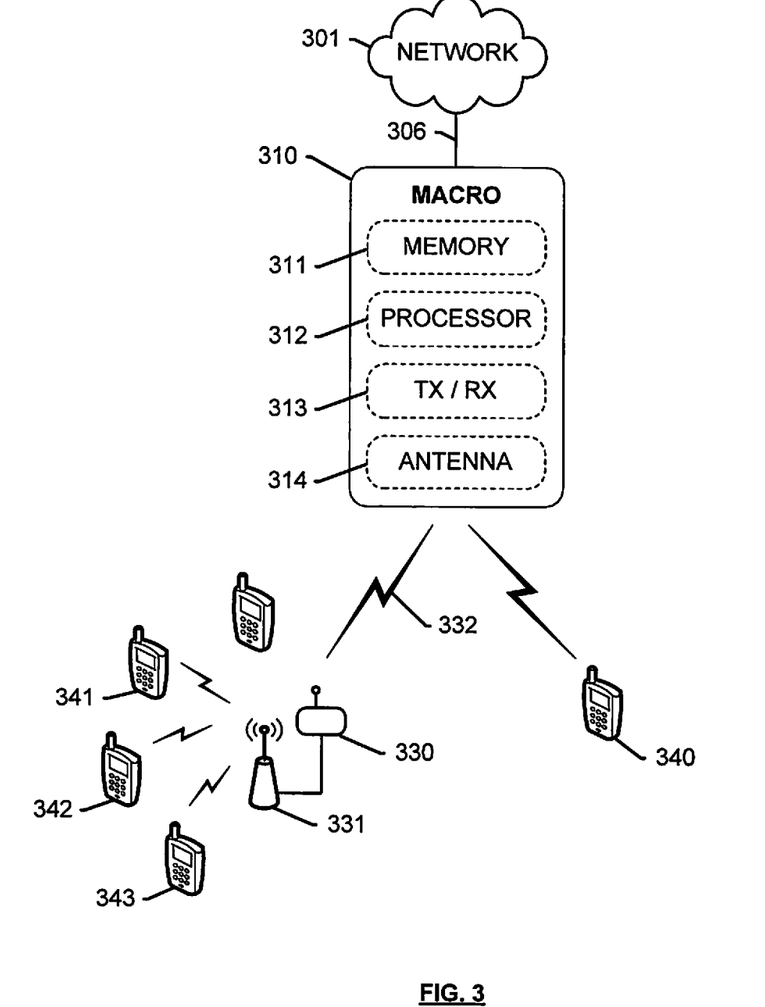
FIG. 3 depicts an exemplary donor access node.

FIG. 3 depicts an exemplary donor access node 310 which may comprise, for example, a macro access node. As described herein, macro access node 310 provides access to network services from network 301 to end-user wireless devices 340, 341, 342, 343, either directly, or via relay wireless device 330. In this embodiment, macro access node 310 is illustrated as being in communication with network 301 via communication link 306, and comprising a memory 311 for storing instructions that enable macro access node 310 to perform operations described herein. Further, macro access node 310 comprises a processor 312 for executing operations, and a transceiver 313 coupled to an antenna 314 for wireless communication with one or more wireless devices, such as end-user wireless device 340, or relay wireless device 330. Further, communication link 306 may be any interface that enables communication between macro access node 310 and network 301, such as an Si interface. Other network nodes such as gateways and controllers may be present but are not shown for purposes of simplicity.

As described herein, macro access node 310, relay wireless device 330, and small access node 331 are configured to transport data packets to and from end-user wireless devices 341, 342, 343 by identifying the type of data packet based on a unique identifier or a radio bearer, and correspondingly compressing or decompressing a header portion of the data packet. For example, small access node 331 may be configured to encapsulate a voice data packet received from one or more end-user wireless devices 341, 342, 343 within a tunnel and to mark a unique value to an IP header of the voice data packet. The unique value may be a differentiated services code point (DSCP) value. Relay wireless device 330 receives the voice data packet, and is configured to compress one or more header portions of the voice data packet including a real-time transport protocol (RTP) header and a GTP tunnel header, to map the tunnel header to a unique bearer that is different from a standard voice bearer used in the network, and to transmit the voice data packet to donor access node 310. The compression uses a robust header compression (RoHC), and one or more RoHC profiles based on which header is being compressed. Macro access node 310 is configured to recognize the data packet as a voice data packet based on the unique bearer, to decompress the header, and to forward the data packet in a second GTP tunnel to one or more gateways, as further described herein. Similarly, a tunnel header of a downlink data packet may be compressed at macro access node 310 and transmitted to relay wireless device 330, where it is decompressed and forwarded to one or more of end-user wireless devices 341, 342, 343. The dual sequential of both RTP and GTP headers described herein makes backhaul connection 332 more efficient, thereby increasing a quality of service for end-user wireless devices 341, 342, 343.

Figure 4A:
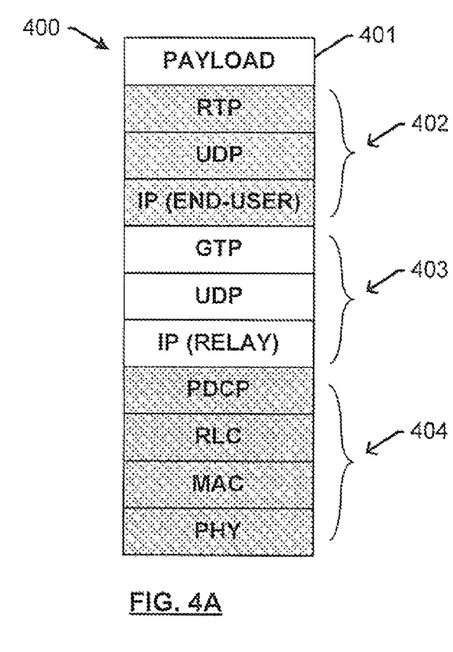
FIGS. 4A-4B depict exemplary data packets encapsulated within first and second GTP headers.
Figure 4B:
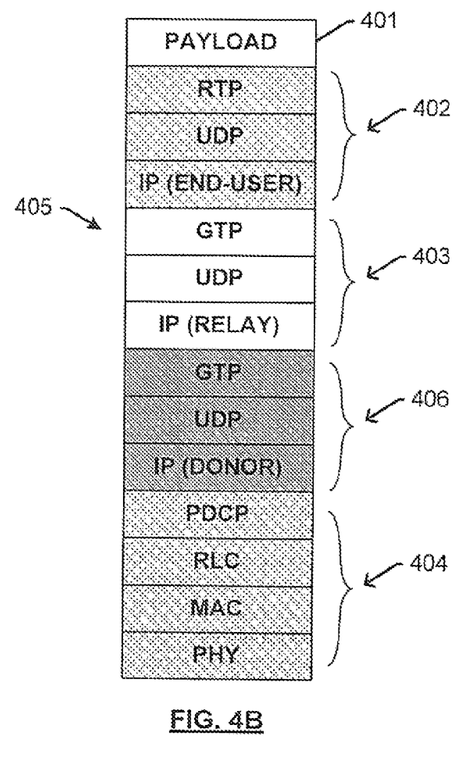

FIGS. 4A-4B depict exemplary data packets encapsulated within first and second GTP headers. Referring to FIG. 4A, data packet 400 comprises a payload 401, which includes the actual data being transmitted, and a plurality of headers 402, 403, 404. Header 402 is a real-time transport protocol (RTP) header, and comprises an RTP portion, a UDP portion, and an IP portion. The IP portion of RTP header 402 is specific to the end-user, i.e. it is addressed between the end-user wireless device, and one or more end-user gateways in communication with the IP network. Header 403 is a first GTP header, and may be added to data packet 400 when data packet 400 is transmitted within a first GTP tunnel that serves traffic to and from a wireless device connected to a small access node such as a picocell. For instance, first GTP header 403 may be appended to data packet 400 by a picocell prior to data packet 400 being transmitted from the picocell to the relay wireless device connected thereto. Consequently, first GTP header 403 comprises a GTP portion, a UDP portion, and an IP portion that is specific to the picell and relay subsystem thereof, i.e. the combination of a picocell, relay wireless device, a relay gateway in the network, as well as additional network elements or nodes that process the data packet at the relay level. Further, header 404 includes additional headers for different network layers, such as a physical layer, L2 layer, etc.

In embodiments described herein, the first GTP tunnel may be maintained at least until a relay gateway of a network, upon which GTP header 403 may be removed, modified, or a second GTP header added. Referring to FIG. 4B, data packet 405 is similar to data packet 400, with the exception of a second header 406 added. Thus, data packet 405 comprises data packet 400 encapsulated in a first GTP tunnel serving picocell traffic, additionally encapsulated in a second GTP tunnel serving traffic to/from another network element. In other words, second GTP header 406 represents a GTP tunnel between another set of network elements, such as between a donor access node and another network element that is receiving data packet 405 from or transmitting data packet 405 to a donor access node. For example, second GTP tunnel header may be added by a donor access node, as further described herein. Consequently, second GTP tunnel header 406 includes a donor-specific IP portion.

In exemplary embodiments described herein, the payload has a size of 32 bytes, the RTP header 402 has a size of 60 bytes, and GTP headers 403 and 406 have a size of 56 bytes each. These exemplary sizes assume usage of an AMR 12.2 kbps codec, which yields an RTP portion of the RTP header having 12 bytes, the UDP portion having 8 bytes, the IPv6 portion having 40 bytes, and the GTP header having 8 bytes. A total size of the RTP and GTP headers therefore results in 116 bytes. In exemplary embodiments depicted herein, the combination of the RTP and GTP header is compressed to less than 116 bytes, thereby yielding greater efficiency in a backhaul connection. The compression of the header portions may be based on the known sizes of the various header portions of the data packet, as well as based on the unique bearer and DSCP assignments described herein.

Figure 5:
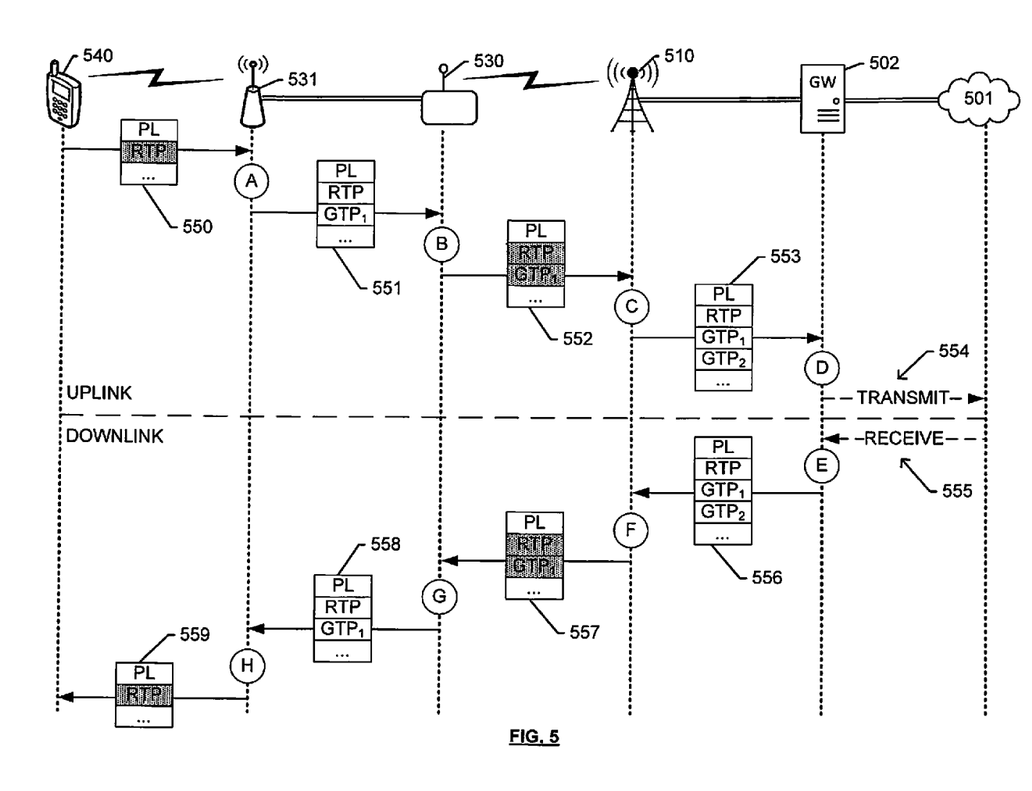
FIG. 5 depicts an exemplary network flow for compressing data on a backhaul connection.

FIG. 5 depicts an exemplary network flow for compressing data on a backhaul connection, and FIGS. 6-9 depict exemplary methods performed in the context of the flow described in FIG. 5. The flow and methods are generally discussed with reference to an end-user wireless device 540, a small access node 531 in wired communication with a relay wireless device 530, a donor access node 510, one or more gateways 502, and a packet-based network 501. Relay wireless device 530 is configured to relay services from access node 510 to end-user wireless device 540 via small access node 531. In other embodiments, the flow can be implemented with any suitable network element. Although FIGS. 5-9 depict steps performed in a particular order for purposes of illustration and discussion, the operations discussed herein are not limited to any particular order or arrangement. One skilled in the art, using the disclosures provided herein, will appreciate that various steps of the depicted methods can be omitted, rearranged, combined, and/or adapted in various ways.

Referring to FIG. 5, an uplink portion of the flow begins when wireless device 540 maps an RTP data packet, such as a voice packet, to a specific QCI radio bearer, such as a QCI radio bearer 1 that is specific to voice media packets. The mapping may be performed based on a traffic flow template (TFT) packet filter rule. TFTs, also known as application templates, are series of data filters such as class of service (CoS), packet data protocol (PDP) context and security settings, etc. that allow a packet-based network to classify packets received from an external network into the correct context. When an incoming data packet arrives at any network node, a packet classifier makes a PDP context selection based on the traffic flow template, and maps the incoming data packets into the PDP context with the correct CoS attributes. Further, wireless device 540 compresses the RTP header (comprising the RTP/UDP/IP portions described above), and sends the data packet with the compressed header 550 to small access node 531. Consequently, the RTP header portion of data packet 550 is shaded, to indicate that it is compressed. PL represents the payload, and " . . . " represents additional headers that are not shown for simplicity. Moreover, the compression may use a known RoHC profile for the RTP header.

Figure 6:
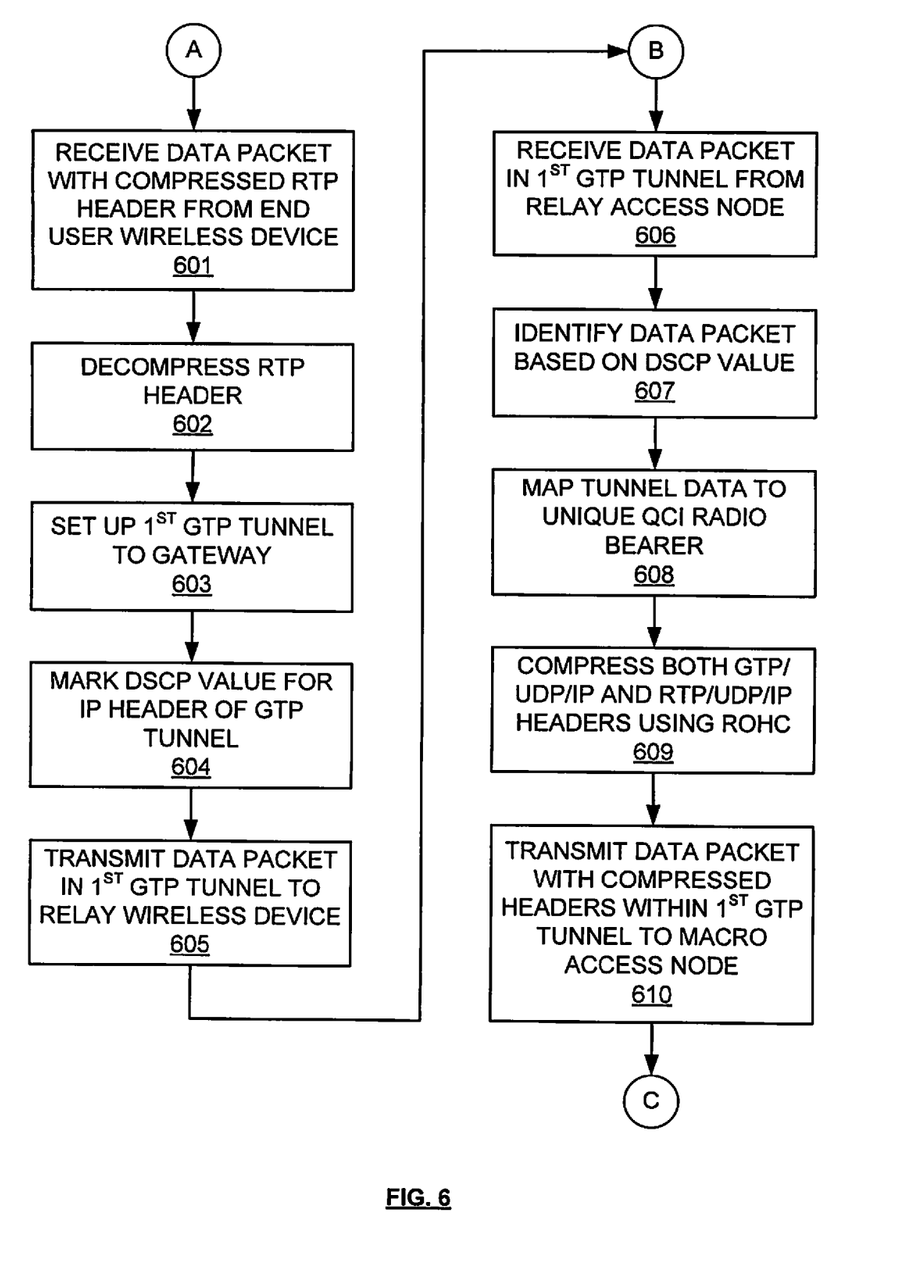
FIG. 6 depicts an exemplary method for compressing uplink data on a backhaul connection at a relay node.

Small access node 531 receives data packet 550 and performs operations "A" that are further described in FIG. 6. For example, with reference to FIG. 6, small access node 531 receives the data packet with the compressed RTP header from end-user wireless device 540 in step 601, and decompresses the RTP header to its normal size in step 602. In step 603, small access node 531 sets up a first tunnel, such as a GTP tunnel, by adding a GTP header portion to the data packet. In step 604, small access node 531 marks a DSCP value of the IP portion of the GTP tunnel header as a voice media specific value. In step 605, small access node 531 transmits the data packet in the first GTP tunnel to relay wireless device 530, eventually to be forwarded to a gateway 502. Referring back to FIG. 5, data packet 551 is depicted as having full-sized headers, including a $GTP_1$ header representing the first GTP tunnel.

Relay wireless device 530 receives data packet 551, and performs operations B further described in FIG. 6. Referring back to FIG. 6, relay wireless device 530 receives data packet 551 in step 606, and identifies in step 607 that it is a specific type of data packet, such as a voice media packet, based on the DSCP value assigned in method A performed by small access node 531. In step 608, relay wireless device 530 maps the tunnel data, i.e. the first GTP header, to a voice-media specific QCI radio bearer that is different from the typical radio bearer used in the network. For example, if the standard voice-media QCI bearer is bearer 1 as assigned by end-user wireless device 540, the new QCI bearer may be any other value such as bearer 255. This enables other network nodes such as donor access node 510 to recognize the contents of the data packet without having to perform extensive deep packet inspection (DPI) operations.

Further, in step 609, relay wireless device 530 compresses both the GTP and RTP headers, for instance using a robust header compression (RoHC). One or more RoHC operations may be used in any combination, including: a) performing a single RoHC compression of the entire RTP/UDP/IP/GTP/UDP/IP header to a size less than 116 bytes, b) performing a sequential dual RoHC compression, whereby the GTP header (comprising the GTP/UDP/IP portions) is first compressed to a size less than 56 bytes, and the RTP header (comprising the RTP/UDP/IP portions) is then compressed to a size less than 60 bytes, or c) performing a single RoHC compression, including compressing the UDP/IP portion of the GTP tunnel header to a size less than 48 bytes. The first method requires a new RoHC compression profile that is able to compress the entire RTP/UDP/IP/GTP/UDP/IP header. The second method may be performed using a combination of an existing 3GPP RoHC profile for the RTP header and a new RoHC profile for the GTP header. The third method may be performed using a new RoHC profile for the UDP/IP portions of the GTP header. In either case, subsequent to compression 609, in step 610 relay wireless device 530 transmits the data packet with compressed headers within the first GTP tunnel to a macro access node, such as donor access node 510. See, for instance, FIG. 5, depicting a data packet 552 with shaded (i.e. compressed) RTP and $GTP_1$ headers.

Figure 7:
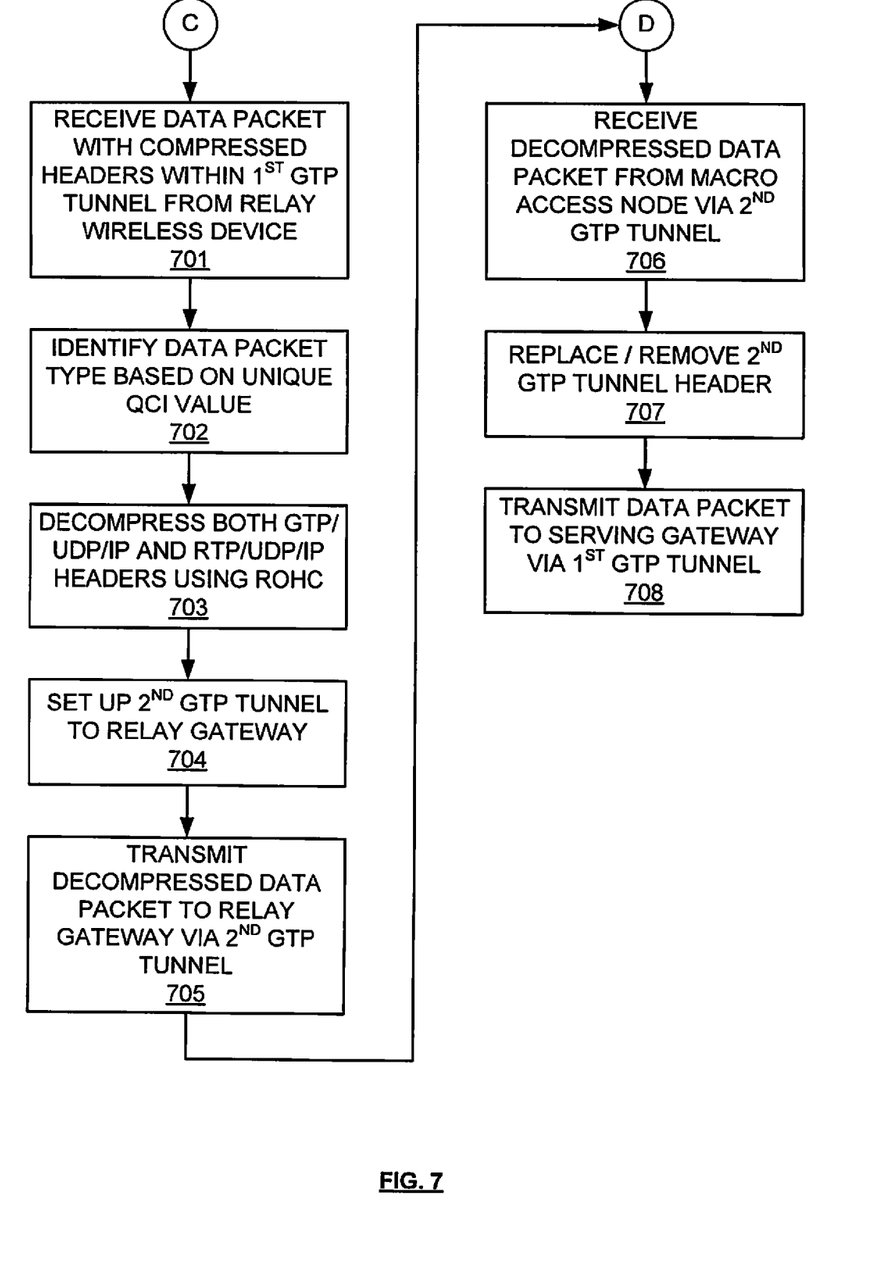
FIG. 7 depicts an exemplary method for decompressing uplink data on a backhaul connection at a donor access node and a gateway.

Donor access node 510 receives data packet 552 and performs operations C further described in FIG. 7. For example, with reference to FIG. 7, a donor access node receives the data packet with compressed headers within the first GTP header in step 701 and, in step 702, identifies that it is a relayed voice-media data packet, based on the GTP header and the unique QCI value (e.g., QCI 255) that was assigned to the GTP header. Based on this information, in step 703, small the donor access node performs a decompression, such as a RoHC decompression, that corresponds to the compression technique used by the relay wireless device. For instance, if the first option (a) is used, the donor access node performs a single RoHC decompression over the entire RTP/UDP/IP/GTP/UDP/IP header. If the second option (b) is used, the donor access node performs a sequential dual RoHC decompression by first decompressing the GTP tunnel header and then decompressing the RTP header. If the third option (c) is used, the donor access node performs a single RoHC decompression over the UDP/IP portion of the GTP tunnel header. The donor access node then sets up a second tunnel in step 704, and transmits the data packet with decompressed headers via the second tunnel to a relay gateway in step 705. For instance, the second tunnel may be a GTP/UDP/IP tunnel header identifying a relay serving gateway (S-GW).

Referring back to FIG. 5, a gateway 502, such as a relay S-GW, receives data packet 553 with decompressed headers. As described herein, gateway 502 may be one or more of a number of gateways that include S-GWs, P-GWs, and additional gateways providing communication with network 501. In this case, a relay S-GW performs operations D further described in FIG. 7. For instance, with reference to FIG. 7, the relay S-GW receives the data packet in the second tunnel in step 706 and, in step 707, replaces the second GTP tunnel header with a header that is directed towards an additional gateway, such as a relay packet-data network gateway (Relay P-GW). Further inclusive in step 707, the relay P-GW takes off the second GTP tunnel header, then sends the data packet with the first tunnel header to another gateway in step 708, such as an end-user serving gateway (UE S-GW) or a end-user packet gateway (UE P-GW). UE S-GW and UE P-GW process the data packets and transmit them to the packet-based network, such as network 501 in step 554 of FIG. 5.

Figure 8:
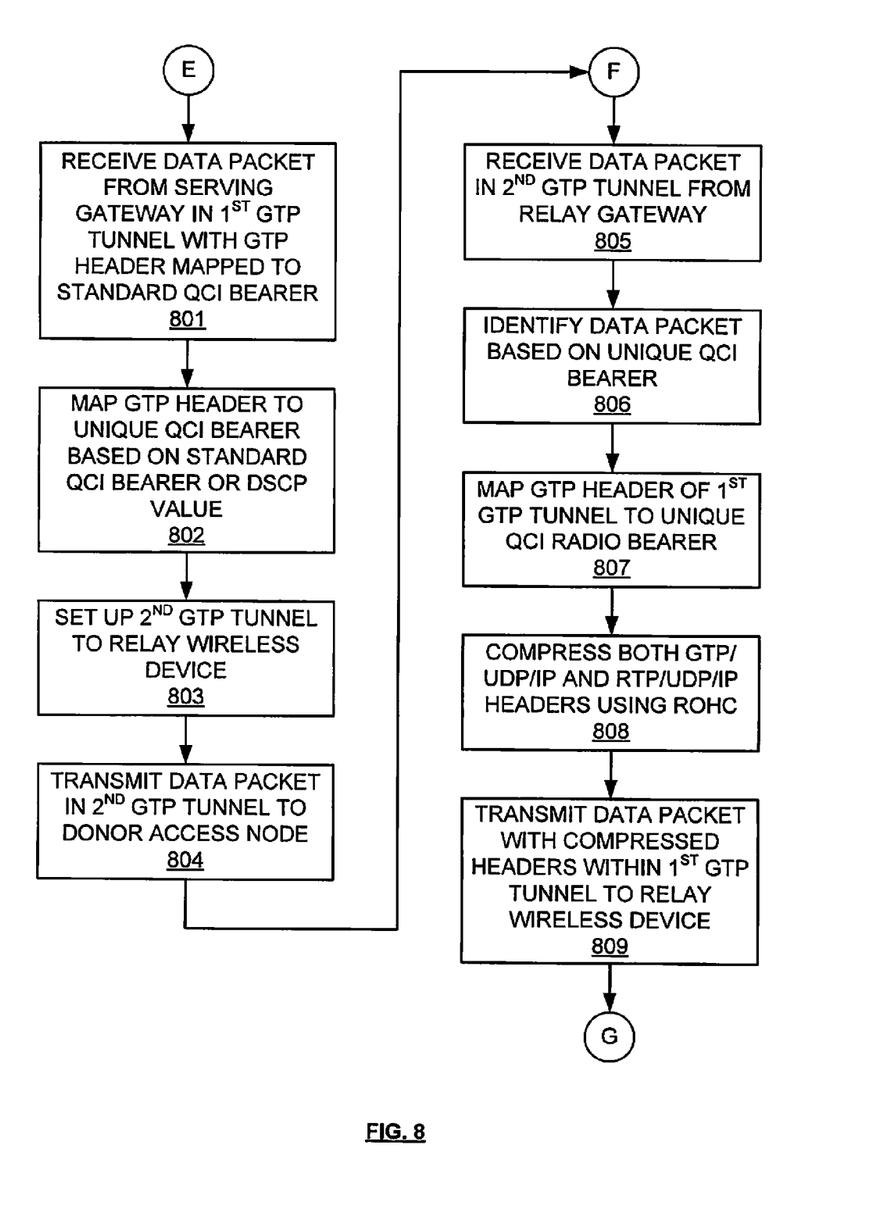
FIG. 8 depicts an exemplary method for compressing downlink data on a backhaul connection at a donor access node and a gateway.

Referring again to FIG. 5, a downlink portion of the flow begins when a gateway, such as a relay gateway, serving gateway, or any combination thereof, receives a data packet, such as a voice data packet, from network 501, and performs operations E that are further described in FIG. 8. For instance, a relay gateway such a relay P-GW or relay S-GW receives the data packet from an end-user gateway such as a UE-S-GW or UE P-GW, with the GTP header mapped to a standard QCI bearer, and a DSCP value of the IP header of the GTP tunnel mapped as a voice-media specific value. For instance, the UE P-GW may have mapped a voice data packet to a voice-specific QCI (e.g., QCI=1) radio bearer based on a TFT packet filter rule. The first GTP header may thus be mapped to the bearer associated with the voice data. The UE P-GW may have replaced the GTP tunnel header to transmit the data packet to a UE S-GW, which then marks the DSCP value of IP header of the GTP tunnel as a voice media specific value, and sends the tunnel data to gateway 510, which may be a combination of a relay P-GW and relay S-GW.

With reference to FIG. 8, in step 801, the relay P-GW may receive the data packet from a serving gateway in a first GTP tunnel with the GTP header mapped to the standard voice-specific QCI bearer. Upon receipt, in step 802, the relay P-GW maps the GTP packet headers to a relay-specific voice media bearer (e.g., QCI 255), based either upon the TFT packet filter rule, or based on the DSCP value of the data packet. The relay-specific voice media bearer is necessarily different from the standard voice media bearer (e.g., QCI 1), thereby enabling other devices such as donor access node 510 and relay wireless 530 to identify the data packet and properly compress/decompress the packet. The relay P-GW may set up a second GTP tunnel in step 803, and send the packet to a relay S-GW via the second GTP tunnel associated with the new unique relay-specific QCI bearer. The relay S-GW replaces the second GTP tunnel header to identify a macro access node, such as donor access node 510, then sends the data packet in the second GTP tunnel to the donor access node using the same relay-specific QCI bearer, in step 804.

Referring back to FIG. 5, a data packet 556 having as-yet no compressed headers, and encapsulated within two tunnels, is received at donor access node 510, thus triggering operations F that are further described in FIG. 8. Referring back to FIG. 8, a macro access node such as donor access node 510 receives the data packet in the second GTP tunnel from a relay gateway, or relay S-GW, and in step 806, identifies the data packet based on the unique QCI bearer. Since the bearer is different from the standard bearer, the donor access node is able to properly compress the data packet. In step 807, the donor access node maps the tunnel data of the first GTP tunnel to the same unique relay-specific QCI radio bearer (e.g., QCI 255), and compresses both the GTP and RTP headers of the data packet in step 808.

The donor access node can perform a RoHC compression using any of the three methods as described above. For instance, one or more RoHC operations may be used in any combination, including: a) performing a single RoHC compression of the entire RTP/UDP/IP/GTP/UDP/IP header to a size less than 116 bytes, b) performing a sequential dual RoHC compression, whereby the GTP header (comprising the GTP/UDP/IP portions) is first compressed to a size less than 56 bytes, and the RTP header (comprising the RTP/UDP/IP portions) is then compressed to a size less than 60 bytes, or c) performing a single RoHC compression, including compressing the UDP/IP portion of the GTP tunnel header to a size less than 48 bytes. The first method requires a new RoHC compression profile that is able to compress the entire RTP/UDP/IP/GTP/UDP/IP header. The second method may be performed using a combination of an existing 3GPP RoHC profile for the RTP header and a new RoHC profile for the GTP header. The third method may be performed using a new RoHC profile for the UDP/IP portions of the GTP header. In either case, the data packet with the compressed header is transmitted in step 809 to the relay wireless device in the first GTP tunnel.

Figure 9:
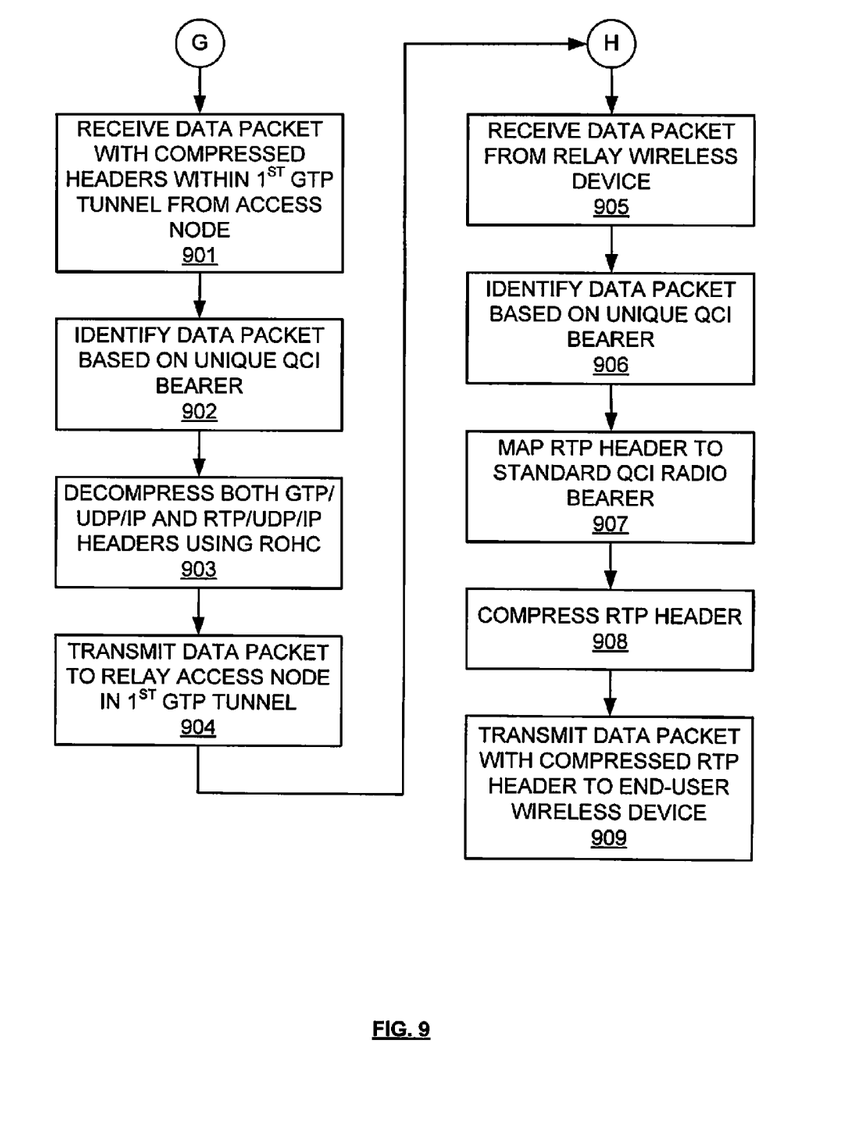
FIG. 9 depicts an exemplary method for decompressing downlink data on a backhaul connection at a relay node.

Referring again to FIG. 5, data packet 557 with compressed RTP and $GTP_1$ headers is received at relay wireless device 530, upon which operations G are performed, as further described in FIG. 9. For instance, with reference to FIG. 9, the relay wireless device receives the data packet in step 901 from the donor access node in the first GTP tunnel, and in step 902, identifies that it is a relay-specific voice media data packet based on the unique QCI bearer (e.g., QCI 255). In step 903, the relay wireless device can perform a decompression, such as an RoHC decompression corresponding to the type of compression method used at the donor access node. For instance, if the first option (a) is used, the relay wireless device performs a single RoHC decompression over the entire RTP/UDP/IP/GTP/UDP/IP header. If the second option (b) is used, the relay wireless device performs a sequential dual RoHC decompression by first decompressing the GTP tunnel header and then decompressing the RTP header. If the third option (c) is used, the relay wireless device performs a single RoHC decompression over the UDP/IP portion of the GTP tunnel header. In either case, the data packet with decompressed headers is then bridged/forwarded to the small access node to be subsequently forwarded to the end-user wireless device that is the destination of the data packet.

For instance, with reference to FIG. 5, data packet 558 with decompressed headers RTP and $GTP_1$ is received at small access node 531, upon with operations H are performed, as further described in FIG. 9. Referring back to FIG. 9, the small access node identifies the data packet in step 906 based on the unique voice-media specific QCI bearer association described above, and in step 907, maps the RTP header of the voice packets to a standard voice-media specific QCI bearer (e.g., QCI=1). The RTP header is subsequently compressed in step 908, and the voice packet with the compressed header is forwarded to the end-user wireless device in step 909. Referring to FIG. 5, the end-user wireless device 540 receives data packet 559 with the compressed RTP header, and processes it as usual, for instance, by decompressing the RTP header to its normal size, then sending the decompressed voice packet to the application destination.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 310, wireless devices 130, 230, gateways 102, 502, and/or network 101.

Figure 10:
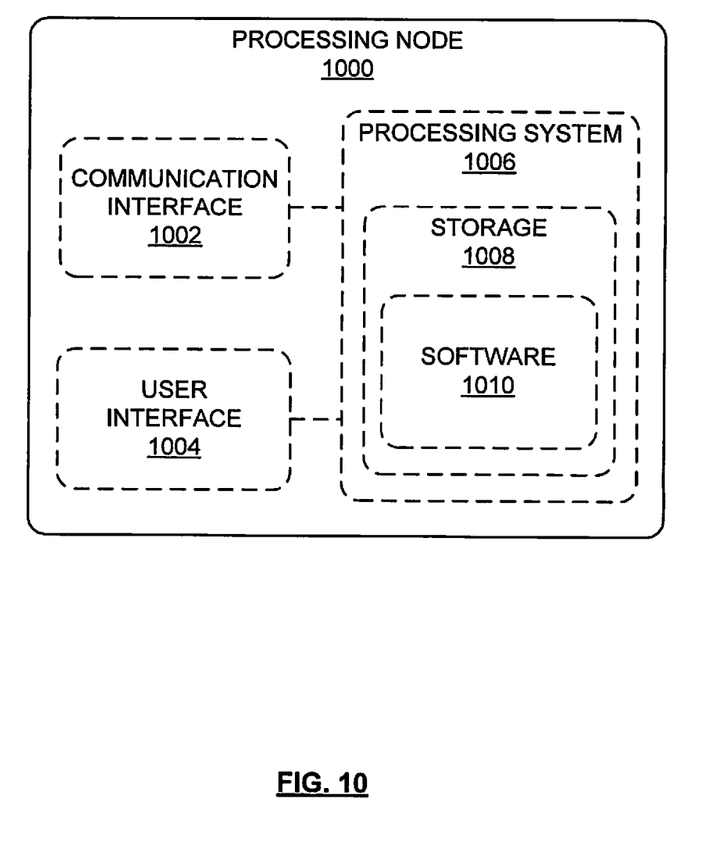
FIG. 10 depicts an exemplary processing node.

FIG. 10 depicts an exemplary processing node 1000 comprising communication interface 1002, user interface 1004, and processing system 1006 in communication with communication interface 1002 and user interface 1004. Processing system 1006 includes storage 1008, which can comprise a disk drive, flash drive, memory circuitry, or other memory device. Storage 1008 can store software 1010 which is used in the operation of the processing node 1000. Storage 1008 may include a disk drive, flash drive, data storage circuitry, or some other memory apparatus. Software 1010 may include computer programs, firmware, or some other form of machine-readable instructions, including an operating system, utilities, drivers, network interfaces, applications, or some other type of software. For example, software 1010 may include modules for perform the operations described with reference to FIGS. 5-9. Processing system 1006 may include a microprocessor and other circuitry to retrieve and execute software 1010 from storage 1008. Processing node 1000 may further include other components such as a power management unit, a control interface unit, etc., which are omitted for clarity. Communication interface 1002 permits processing node 1000 to communicate with other network elements. User interface 1004 permits the configuration and control of the operation of processing node 1000.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for compressing data on a backhaul link of a relay device, the method comprising:
   receiving, at the relay device, a data packet via a GPRS tunneling protocol (GTP) tunnel;
   compressing a header portion of the data packet, wherein the header portion comprises a real-time-transport protocol (RTP) header portion, wherein compressing the header portion further comprises using a sequential dual robust header compression, the sequential dual robust header compression further comprising a) compressing the GTP header portion using a new robust header compression profile, and b) compressing the RTP header portion using an existing robust header compression profile; and
   transmitting the data packet with the compressed header portion to a macro access node.

2. The method of claim 1, wherein the data packet is a voice-over-IP (VoIP) data packet.

3. The method of claim 2, further comprising mapping a tunnel data of the GTP tunnel to a quality-of-service class identifier (QCI) bearer that is different from a standard voice QCI bearer.

4. The method of claim 2, wherein the data packet is received from an end-user wireless device attached to a relay access node, the relay access node being communicatively coupled to the relay device.

5. The method of claim 4, wherein the relay access node marks the data packet with a unique differentiated services code point (DSCP) value that is specific to voice media.

6. The method of claim 5, further comprising identifying, at the relay node, the data packet as a VoIP data packet based on the DSCP value.

7. The method of claim 1, wherein compressing the header portion further comprises compressing a complete header portion of the data packet using a new robust header compression profile, wherein the complete header portion includes both the RTP header portion and a GTP header portion.

8. The method of claim 7, wherein the complete header is compressed to within 116 bytes.

9. The method of claim 1, wherein the GTP header portion is compressed to within 56 bytes, and wherein the RTP header portion is compressed to within 60 bytes.

10. The method of claim 1, wherein the macro access node performs a sequential decompression of the header portion, and forwards the data packet with decompressed header to a relay serving gateway (S-GW) via a second GTP tunnel.

11. A method for compressing data on a backhaul link of a relay node, the method comprising:
   receiving, at a macro access node via a GPRS tunneling protocol (GTP) tunnel, a data packet comprising a header portion, the header portion further comprising a GTP header portion and a real-time-transport protocol (RTP) header portion;
   compressing the RTP header portion and the GTP header portion using a sequential dual robust header compression, the sequential dual robust header compression further comprising a) compressing the GTP header portion using a new robust header compression profile, and b) compressing the RTP header portion using an existing robust header compression profile; and
   transmitting the data packet with the compressed RTP header portion and the GTP header portion to the relay node.

12. The method of claim 11, wherein the relay node decompresses the RTP header portion using the robust header compression, and forwards the decompressed data packet to an end-user wireless device via a relay access point that is communicatively coupled to the relay node.

13. The method of claim 11, wherein the data packet is a voice over IP (VoIP) data packet, the method further comprising mapping the GTP header of the VoIP data packet to a quality of service class identifier (QCI) bearer that is different from a standard voice QCI bearer.

14. The method of claim 13, wherein the GTP header is mapped to the QCI bearer by one or both of a relay packet data network gateway (P-GW) or a serving gateway (S-GW).

15. The method of claim 13, wherein the GTP header is mapped to the QCI bearer based on one or both of a traffic flow template (TFT) packet filter rule, or a unique differentiated services code point (DSCP) value that is specific to voice media.

16. A system for donor selection, the system comprising:
   a relay access node configured to relay wireless services from a donor access node to one or more wireless devices; and
   a processor communicatively coupled to the relay access node, the processor for configuring the relay access node to execute operations comprising:
      compressing a first real-time-transport protocol (RTP) header portion of an uplink voice-over-IP (VoIP) data packet using an existing robust header compression profile, wherein the VoIP data packet is contained within a GPRS tunneling protocol (GTP) tunnel;
      compressing a first GTP header portion of the uplink VoIP data packet using a new robust header compression profile, wherein compressing both the first RTP header portion and the first GTP header portion is performed using a sequential dual robust header compression; and
      decompressing a second RTP header portion of a downlink VoIP data packet using the existing robust header compression profile;
      wherein the first RTP header portion is decompressed at the donor access node subsequent to the compressing, and
      wherein the second RTP header portion is compressed at the donor access node prior to the decompressing.

17. The system of claim 16, wherein the operations further comprise decompressing a second GTP header portion of the downlink VoIP data packet using the new robust header compression profile.

* * * * *